US010191900B2

(12) United States Patent
Hu et al.

(10) Patent No.: US 10,191,900 B2
(45) Date of Patent: Jan. 29, 2019

(54) METHOD AND APPARATUS FOR PROCESSING SEMANTIC ANALYSIS RESULT BASED ON ARTIFICIAL INTELLIGENCE

(71) Applicant: BAIDU ONLINE NETWORK TECHNOLOGY (BEIJING) CO., LTD., Beijing (CN)

(72) Inventors: Zejin Hu, Beijing (CN); Shujie Yao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/637,419

(22) Filed: Jun. 29, 2017

(65) Prior Publication Data
US 2018/0150455 A1  May 31, 2018

(30) Foreign Application Priority Data
Nov. 30, 2016 (CN) .......................... 2016 1 1089872

(51) Int. Cl.
 *G06F 17/27* (2006.01)
 *G06K 9/72* (2006.01)
 *G06N 5/00* (2006.01)

(52) U.S. Cl.
 CPC ........ *G06F 17/2785* (2013.01); *G06F 17/277* (2013.01); *G06K 9/726* (2013.01); *G06N 5/00* (2013.01); *G06F 17/2765* (2013.01)

(58) Field of Classification Search
 CPC ................................................ G06F 17/2785
 (Continued)

(56) References Cited

U.S. PATENT DOCUMENTS 5,799,276 A * 8/1998 Komissarchik ......... G10L 15/04
                                                  704/207
6,886,010 B2 * 4/2005 Kostoff ............. G06F 17/30705
(Continued)

FOREIGN PATENT DOCUMENTS

| CN | 102043843 A | 5/2011 |
| CN | 104360994 A | 2/2015 |
| CN | 104731918 A | 6/2015 |

OTHER PUBLICATIONS

Chinese Patent Application No. 201611089872.5, English translation of Office Action dated Sep. 30, 2018, 9 pages.
(Continued)

*Primary Examiner* — Susan I McFadden
(74) *Attorney, Agent, or Firm* — Lathrop Gage LLP

(57) ABSTRACT

A method and an apparatus for processing a semantic analysis result based on AI are provided. With the method, the weight of the analysis text in the corresponding analysis result is determined according to the preset weight configuration information; the semantic confidence of the analysis result is detected via the pattern matching algorithm; the analysis type of the analysis texts is determined by the first classification model, and the field matching confidence of the analysis texts over the analysis result is determined by the second classification model; and then the analysis quality data of the analysis result is obtained according to the weights, the semantic confidence, the analysis type and the field matching confidence.

12 Claims, 4 Drawing Sheets

(58) Field of Classification Search
USPC .............................................. 704/9
See application file for complete search history.

(56) References Cited

U.S. PATENT DOCUMENTS

| | | | | |
|---|---|---|---|---|
| 6,965,900 | B2* | 11/2005 | Srinivasa | G06F 17/30699 |
| 8,468,244 | B2* | 6/2013 | Redlich | G06Q 10/06 |
| | | | | 709/225 |
| 8,755,837 | B2* | 6/2014 | Rhoads | G06F 17/30244 |
| | | | | 455/556.1 |

OTHER PUBLICATIONS

Chinese Patent Application No. 201611089872.5, Office Action dated Sep. 30, 2018, 8 pages.

\* cited by examiner

METHOD AND APPARATUS FOR PROCESSING SEMANTIC ANALYSIS RESULT BASED ON ARTIFICIAL INTELLIGENCE

CROSS-REFERENCE TO RELATED APPLICATION

This application is based on and claims a priority to Chinese Patent Application Serial No. 201611089872.5, filed on Nov. 30, 2016, the entire content of which is incorporated herein by reference.

FIELD

The present disclosure relates to the field of information processing, and more particularly, to a method and an apparatus for processing a semantic analysis result based on artificial intelligence.

BACKGROUND

Artificial Intelligence (AI for short) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc.

As one of core techniques in the field of natural language processing, semantic analysis has been widely used. Therefore, an accuracy of a semantic analysis result becomes more and more important, which may influence a quality of a service provided to a user directly. For example, in a navigation application, an accuracy of navigation is directly determined by the accuracy of the semantic analysis result.

SUMMARY

Embodiments of the present disclosure provide a method for processing a semantic analysis result based on AI, including: determining weights of analysis texts in a corresponding analysis result according to preset weight configuration information; detecting a semantic confidence of the analysis result via a pattern matching algorithm; determining an analysis type of the analysis texts by a first classification model, and determining a field matching confidence of the analysis texts over the analysis result by a second classification model; obtaining analysis quality data of the analysis result according to the weights, the semantic confidence, the analysis type, and the field matching confidence.

Embodiments of the present disclosure provide an apparatus for processing a semantic analysis result based on AI, including: a processor; a memory for storing instructions executable by the processor; in which, the processor is configured to: determine weights of analysis texts in a corresponding analysis result according to preset weight configuration information; detect a semantic confidence of the analysis result via a pattern matching algorithm; determine an analysis type of the analysis texts by a first classification model, and determine a field matching confidence of the analysis texts over the analysis result by a second classification model; obtain analysis quality data of the analysis result according to the weights, the semantic confidence, the analysis type, and the field matching confidence.

Embodiments of the present disclosure provide a non-transitory computer readable storage medium. When instructions stored in the storage medium are executed by a processor of a terminal, the terminal is caused to perform a method for processing a semantic analysis result based on AI, and the method includes: determining weights of analysis texts in a corresponding analysis result according to preset weight configuration information; detecting a semantic confidence of the analysis result via a pattern matching algorithm; determining an analysis type of the analysis texts by a first classification model, and determining a field matching confidence of the analysis texts over the analysis result by a second classification model; obtaining analysis quality data of the analysis result according to the weights, the semantic confidence, the analysis type, and the field matching confidence.

Embodiments of the present disclosure provide a computer program product. When instructions stored in the computer program product are executed by a processor, a method for processing a semantic analysis result based on AI is performed, and the method includes: determining weights of analysis texts in a corresponding analysis result according to preset weight configuration information; detecting a semantic confidence of the analysis result via a pattern matching algorithm; determining an analysis type of the analysis texts by a first classification model, and determining a field matching confidence of the analysis texts over the analysis result by a second classification model; obtaining analysis quality data of the analysis result according to the weights, the semantic confidence, the analysis type, and the field matching confidence.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

Above and/or additional aspects and advantages of the present disclosure will become apparent and more easily to understand from the following descriptions of the embodiments of the present disclosure with reference to the drawings, in which.

DETAILED DESCRIPTION

Figure 1:
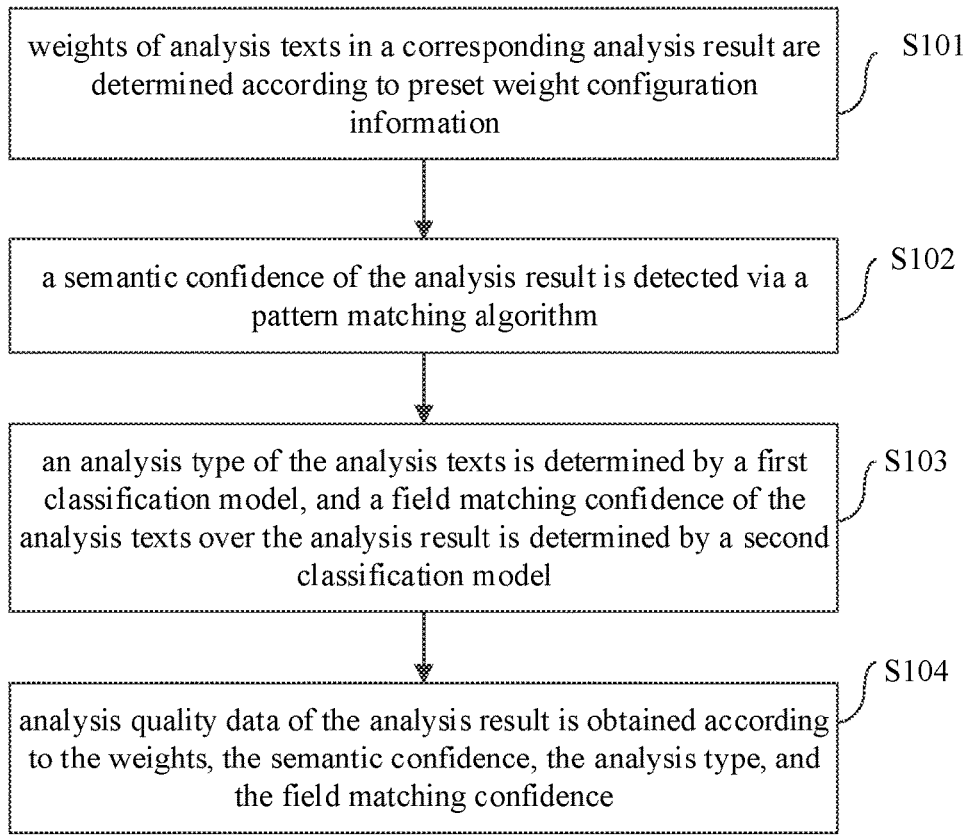
FIG. 1 is a flow chart illustrating a method for processing a semantic analysis result based on AI according to an embodiment of the present disclosure.

Reference will now be made in detail to exemplary embodiments, examples of which are illustrated in the accompanying drawings, wherein the same or similar elements and the elements having same or similar functions are denoted by like reference numerals throughout the descriptions. Embodiments described herein with reference to drawings are explanatory and used to generally understand the present disclosure, and shall not be construed to limit the present disclosure.

The method and apparatus for processing a semantic analysis result based on AI according to embodiments of the present disclosure will be described with reference to drawings as follows. It should be understood that the semantic analysis result is same with the analysis result as follows.

Usually, a matching length algorithm or a TF-IDF (term frequency-inverse document frequency) technique may be used to evaluate the quality of the semantic analysis result in the related art.

In detail, when the matching length algorithm is used to evaluate the quality of the analysis result of an input text, terms with the longest length may be matched as long as possible from the left side of the semantic analysis result until the whole semantic analysis result is segmented, and then terms obtained after the segmentation are matched to terms in the input text, so as to use matching levels therebetween to evaluate the accuracy of the analysis result. The more the terms after the segmentation match to the terms in the input text, the more accurate the analysis result is.

However, in evaluating the quality of the analysis result by the matching length algorithm, the evaluation of the analysis result is only according to the matching levels between the terms after the segmentation and the terms in the input text, and it is not considered that contributions to semanteme from different segmented terms are varied, thus the accuracy of the analysis result is not satisfied.

For example, when a input text in Chinese is "2016 年苹果手机购买 的数量大约是多 少" ("What is the number of purchased Apple mobile-phones in 2016?"), segmented terms of a first analysis result include "2016 年","苹果","购买","数量","多少+ (What", "the number of", "Apple", "purchased", "2016"), while segmented terms of a second analysis result include "2016 年","苹果","手机","数量" ("the number of", "Apple", "mobile-phone", "2016"). Although the similarity between the first segmentation corresponding to the first analysis result and the input text is greater than the similarity between the second segmentation corresponding to the second analysis result and the input text, the second segmentation is more fit to the input text because the term "手机" ("mobile-phone") contributes more to the semanteme.

While, when the IF-IDF algorithm is used to evaluate the accuracy of the analysis result, a frequency of a keyword is used for recognition. However, noises and non-semantic texts may not be distinguished, and a mismatch situation may not be recognized.

For example, for a input text in Chinese "你好意思就意思这一点吗, 你意思是就意思 这一 点吧, 啥呀, 你好歹多意思 一点嘛" (which means "By no means can you just mean to be so mean, do you mean to be so mean, whatever, mean it or not, you just do not be so mean"), an analysis result is " 你好意思就意思这么··点嘛, 你意思是就意思这 一点吗, 你啥意思呀你 " (which means "By no means can you just mean to be so mean, do you mean to be so mean, what do you mean"), even though the keyword "意思" (mean) with a higher word frequency in the analysis result means the same to the keyword "意思" (mean) with a higher word frequency in the input text, the semanteme of the analysis result is not in accordance with the semanteme of the input text.

To solve the above problems of poor accuracy in evaluation of the analysis result, a method for processing a semantic analysis result based on AI is provided in embodiments of the present disclosure. In the method of embodiments of the present disclosure, whether the semantic analysis result is matched to the input text is evaluated based on multiple aspects details are as follows.

FIG. 1 is a flow chart illustrating a method for processing a semantic analysis result based on AI according to an embodiment of the present disclosure.

As illustrated in FIG. 1, the method for processing a semantic analysis result based on AI includes following actions.

At block S101, weights of analysis texts in a corresponding analysis result are determined according to preset weight configuration information.

It should be understood that, in practice, although some analysis texts do not occur in a high frequency, they may contribute a lot to expression of a main idea of the whole analysis result; or although some analysis texts do occur in a high frequency, they may not contribute much to the expression of the main idea of the whole analysis result; or although some analysis texts occur in a similar frequency, they may not contribute the same to the expression of the main idea of the whole analysis result.

For example, in an analysis result "How much is sales of the Apple mobile phones in 2016? how much is it accounted in the total mobile phone sales in 2016, comparing sales of 2016 with that in a decade before 2016, what is the trend", although "2016" occurs more often than "Apple mobile phone" and "sales", "Apple mobile phone" and "sales" contribute more to the expression of the main idea of the analysis result.

In detail, the analysis text may include a word, a phrase, and a long sentence in the analysis result. According to different application requirements, there are different ways to extract the analysis text. For example, the corresponding analysis texts may be extracted according to categories by a way of part-of-speech tagging. For another example, the corresponding analysis texts may be extracted by a way of proper noun recognition.

Therefore, in order to evaluate the analysis result accurately, the weights of the analysis texts in the analysis result should be considered. That is, the weights of the analysis texts in the corresponding analysis result may be determined according to the preset weight configuration information, in which, the preset weight configuration information is configured to denote the weights of the analysis texts in the analysis result, and may be a statistic model trained according to a lot of experiments in advance, or a weight determining algorithm trained in advance.

It should be noted that, according to different application scenarios, the weight of the analysis text in the corresponding analysis result may be determined according to the preset weight configuration information in different ways, examples are as follows.

In a first example, a same analysis text may correspond to different weights according to different field types of the analysis text. For example, for an analysis text "7", its weight in an analysis result "how much is the price of an Apple 7 in general" in the mobile phone field is obviously different from its weight in an analysis result "a prediction of developments of the double cameras technic in 2017" in the news field.

Therefore, the weight may be determined according to the field type of the analysis text. In practice, the field type of the analysis text may be acquired first, and then the weight of the analysis text in the corresponding analysis result is determined according to the preset weight configuration information corresponding to the field type.

In an embodiment, the above preset weight configuration information may be a statistic model or a preset algorithm that is configured to denote the weight of the analysis text and that is set according to the field type in advance. The preset weight configuration information contains a lot of weights of analysis texts according to field types.

It should be understood that according to different application scenarios, the field type of the analysis text may be obtained in different ways. For example, an analysis text classification model may be trained according to a lot of experiments in advance, so that the field type of the analysis text may be obtained by inputting the analysis text into the classification model.

In a second example, analysis texts of different part-of-speech types may correspond to different weights. For example, for an analysis result "how much is the price of an Apple 7 in general", weights of the nominal analysis texts "Apple 7" and "price" are obviously different from the weight of the adverbial analysis text "in general".

Therefore, the weight may be determined according to the part-of-speech of the analysis text. In practice, the part-of-speech of the analysis text may be acquired first, and then the weight of the analysis text in the corresponding analysis result is determined according to the preset weight configuration information corresponding to the part-of-speech.

In an embodiment, the above preset weight configuration information may be a statistic model or a preset algorithm that is configured to denote the weight of the analysis text and that is set according to the part-of-speech types in advance. The preset weight configuration information contains a lot of weights of analysis texts according to part-of-speech types.

At block S102, a semantic confidence of the analysis result is detected via a pattern matching algorithm.

In practice, a lot of non-semantic words may occur in the analysis result, for example, chat words "how are you". In order to evaluate the analysis result accurately, the semantic confidence of the analysis result needs to be detected.

In detail, the semantic confidence of the analysis result may be detected by the pattern matching algorithm. In an embodiment, the pattern matching algorithm is configured to determine whether the present analysis result has an obvious semanteme and its confidence.

In detail, according to different application requirements, the pattern matching algorithm may include different contents, thus the ways of using the pattern matching algorithm to detect the analysis result may be different, and details are as follows.

As an example, the pattern matching algorithm may include a white list of those have semanteme and a black list of those do not have semanteme. The analysis texts of the analysis result are matched to the above white list and black list. The semantic confidence of the analysis result is calculated according to the match levels and the match numbers between the analysis texts and the white list and the black list.

In this example, the more the analysis result matches to the white list, the higher the match level is, the higher the semantic confidence of the analysis result might be; the more the analysis result matches to the black list, the higher the match level is, the lower the semantic confidence of the analysis result might be.

At block S103, an analysis type of the analysis texts is determined by a first classification model, and a field matching confidence of the analysis texts over the analysis result is determined by a second classification model.

In detail, evaluation accuracy of the analysis result is related to the analysis type and the field (e.g. text field, digital field, computer field) of the analysis text, in which, the analysis type includes the whole sentence of the analysis result matching, parts of the analysis texts matching, the whole analysis texts matching, etc. The more the part of the analysis result participate in the evaluation accounts for, the more accurate the evaluation of the analysis result is.

In detail, the first classification model and second classification model for classifying analysis types and fields are trained according to massive sample data in advance, in which the classification models may include a distinguishing analysis model, a clustering analysis model, etc., and then the analysis type of the analysis texts is determined by the first classification model, and the field matching confidence of the analysis texts over the analysis result is determined by the second classification model.

It should be noted that the above determining the analysis type of the analysis texts by the first classification model, and determining the field matching confidence of the analysis texts over the analysis result by the second classification model can be realized according to the related art, thus will not be elaborated here.

At block S104, analysis quality data of the analysis result is obtained according to the weights, the semantic confidence, the analysis type, and the field matching confidence.

In detail, an overall consideration of the weights, the semantic confidence, the analysis type, and the field matching confidence is used to obtain the analysis quality data of the analysis result, in which the analysis quality data of the analysis result may include accuracy of the present analysis result, thus the obtained analysis quality data of the analysis result can accurately reflect the quality of the analysis result.

It should be noted that, according to different application scenarios, the ways of obtaining the analysis quality data of the analysis result according to the weights, the semantic confidence, the analysis type, and the field matching confidence are different, and examples are as follows.

As a first example, the weights, the semantic confidence, the analysis type, and the field matching confidence are normalized and converted to data in a united format or of a same type (for example, a centesimal type), then corresponding mathematic operations are performed to the normalized data, so as to obtain the analysis quality data of the analysis result.

In this example, the normalized results of the weights, the semantic confidence, the analysis type, and the field matching confidence are summed up, so as to obtain the analysis quality data of the analysis result.

As a second example, in practice, the weights, the semantic confidence, the analysis type and the field matching confidence may have different influences on the analysis quality of the analysis result, i.e. they may have different weights in the evaluation of the analysis quality.

Thus, in this example, a weighted calculation model is trained according to massive experiment data, in which the weighted calculation model includes weight values corresponding to the weight, the semantic confidence, the analysis type and the field matching confidence. Therefore the weights, the semantic confidence, the analysis type and the field matching confidence may be summed up with the weight values so as to obtain the analysis quality data of the analysis result.

For example, in a trained weighted calculation model, the weight values corresponding to the weights, the semantic confidence, the analysis type and the field matching confidence are $\alpha$, $\beta$, $\gamma$, and $\delta$, the analysis quality data of the analysis result is calculated by the flowing equation:

$$score=\alpha*p(term)+\beta*p(semantic)+\gamma*p(domain)+\delta*p(pattern)+b$$

in which, p(term) represents a summation of the weights corresponding to the analyzed texts, p(semantic) represents the semantic confidence, p(domain) and p(pattern) represent the field matching confidence and the analysis type, b represents a bias for modifying the analysis quality data.

With the method for processing a semantic analysis result based on AI according to embodiments of the present disclosure, the weight of the analysis text in the corresponding analysis result is determined according to the preset weight configuration information; the semantic confidence of the analysis result is detected via the pattern matching algorithm; the analysis type of the analysis texts and the field matching confidence of the analysis texts over the analysis result are determined by the corresponding classification models; and then the analysis quality data of the analysis result is obtained according to the weights, the semantic confidence, the analysis type and the field matching confidence. Therefore, when the quality of the analysis result is evaluated, the weights, the semantic confidence, the analysis type and the field matching confidence are synthetically considered, thereby improving the accuracy of evaluating the quality of the semantic analysis result.

Based on above embodiments, it should be understood that, in practice, for an application scenario, there are often more than one analysis results, thus the analysis results must be fed back to the user based on a recommendation optimal principle, according to the obtained analysis quality data of the analysis result.

According to different application scenarios, when a plurality of analysis results are obtained, there are multiple ways to feed back the analysis results to the user. For example, an optimal analysis result may be fed back to the user, or top three analysis results with the best analysis quality may be fed back to the user, or multiple analysis results with better analysis quality are feed back to the user in an order of qualities from the highest to the lowest.

To make a clear description of how the analysis results are fed back to the user when the plurality of analysis results are obtained, an example of feeding back the plurality of analysis results with relatively better analysis quality to the user in an order of qualities from the highest to the lowest is illustrated as follows.

Figure 2:
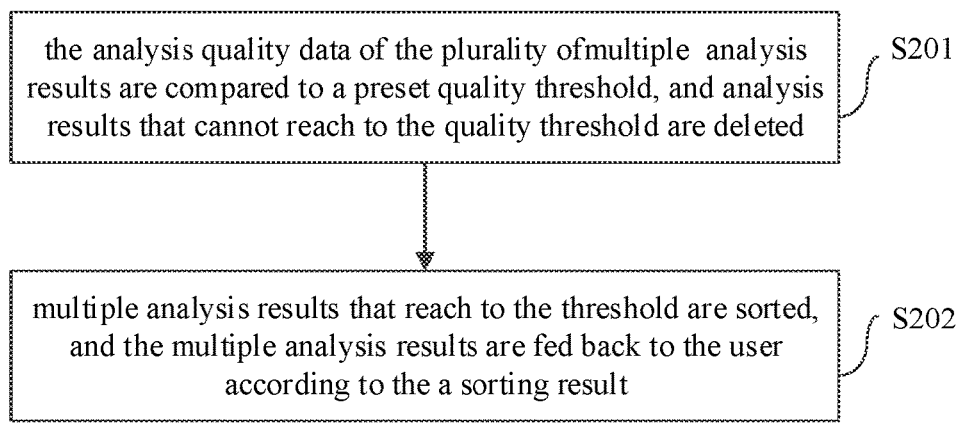
FIG. 2 is a flow chart illustrating a method for processing a semantic analysis result based on AI according to another embodiment of the present disclosure.

FIG. 2 is a flow chart illustrating a method for processing a semantic analysis result based on AI according to another embodiment of the present disclosure. As illustrated in FIG. 2, after the above block S104, the method may further include following actions.

At block S201, the analysis quality data of the plurality of analysis results are compared to a preset quality threshold, and analysis results that cannot reach to the quality threshold are deleted.

It should be noted that the quality threshold is set according to massive experiment data in advance, and the quality threshold is configured to evaluate the analysis quality of the analysis result. The analysis quality data of the plurality of analysis results are compared to the preset quality threshold, and then analysis results that cannot reach to the quality threshold are deleted.

For example, when an analysis quality data of an analysis result is greater than the preset quality threshold, this means the analysis result is with a relatively better analysis quality; while when an analysis quality data of an analysis result is less than the preset quality threshold, that means the analysis result is with a relatively worse analysis quality, and then the analysis result that cannot reach to the threshold is then deleted.

At block S202, analysis results that reach to the threshold are sorted, and the analysis results are fed back to the user according to a sorting result.

In detail, sorting of the analysis results that reach to the threshold may be performed in an order of the analysis qualities of the analysis results from the highest to the lowest, and the analysis results are fed back to the user according to the sorting result. Therefore the user may read the analysis results with relatively better analysis qualities more directly as common custom from the top to the bottom.

For example, the analysis results may be sorted according to the differences between the analysis quality data and the preset quality threshold. The more the analysis quality data is greater than the preset quality threshold, the greater the difference is, the better the analysis result is, and the more prior the sorting order should be, thus the user may observe the analysis results with relatively better analysis quality more directly from the multiple feedback analysis results.

With the method for processing a semantic analysis result based on AI according to embodiments of the present disclosure, the analysis quality data of the plurality of analysis results are compared to the preset quality threshold, the analysis results that cannot reach to the threshold are deleted and the analysis results that reach to the threshold are sorted, and the analysis results that reach to the threshold are fed back to the user according to the sorting result. Thus the user may observe the analysis result with a better analysis quality more directly, such that the performance of the semantic analysis is increased.

Figure 3:
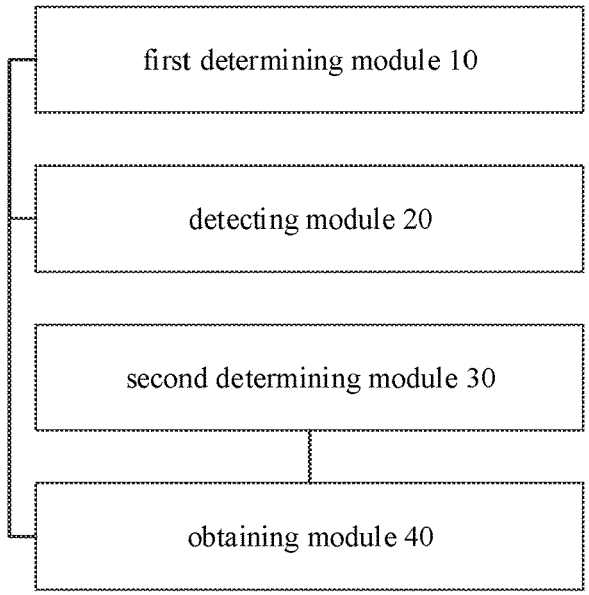
FIG. 3 is a block diagram illustrating an apparatus for processing a semantic analysis result based on AI according to an embodiment of the present disclosure.

In order to realize the above embodiments, an apparatus for processing a semantic analysis result based on AI is further provided in the present disclosure. FIG. 3 is a block diagram illustrating an apparatus for processing a semantic analysis result based on AI according to an embodiment of the present disclosure. As illustrated in FIG. 3, the apparatus for processing a semantic analysis result based on AI includes a first determining module 10, a detecting module 20, a second determining model 30 and an obtaining module 40.

The first determining module 10 is configured to determine weights of analysis texts in a corresponding analysis result according to preset weight configuration information.

Figure 4:
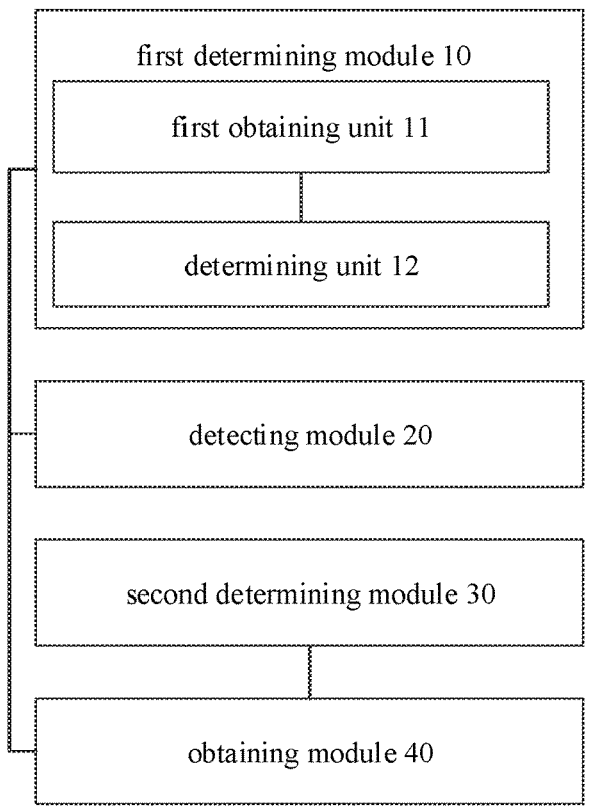
FIG. 4 is a block diagram illustrating an apparatus for processing a semantic analysis result based on AI according to another embodiment of the present disclosure.

In an embodiment of the present disclosure, FIG. 4 is a block diagram illustrating an apparatus for processing a semantic analysis result based on AI according to another embodiment of the present disclosure. As illustrated in FIG. 4, on the basis of FIG. 3, the first determining module 10 includes a first obtaining unit 11 and a determining unit 12.

In detail, the first obtaining unit 11 is configured to obtain a field type of each of the analysis texts.

The determining unit 12 is configured to determine a weight of the each of the analysis texts in the corresponding analysis result according to preset weight configuration information corresponding to the field type.

The detecting module 20 is configured to detect a semantic confidence of the analysis result via a pattern matching algorithm.

The second determining model 30 is configured to determine an analysis type of the analysis texts by a first classification model, and determine a field matching confidence of the analysis texts over the analysis result by a second classification model.

The obtaining module 40 is configured to obtain analysis quality data of the analysis result according to the weights, the semantic confidence, the analysis type, and the field matching confidence.

In an embodiment of the present disclosure, the obtaining module 40 is configured to perform a weighted calculation to obtain analysis quality data of the analysis result according to the weights, the semantic confidence, the analysis type, and the field matching confidence via a preset weighted calculation model.

Figure 5:
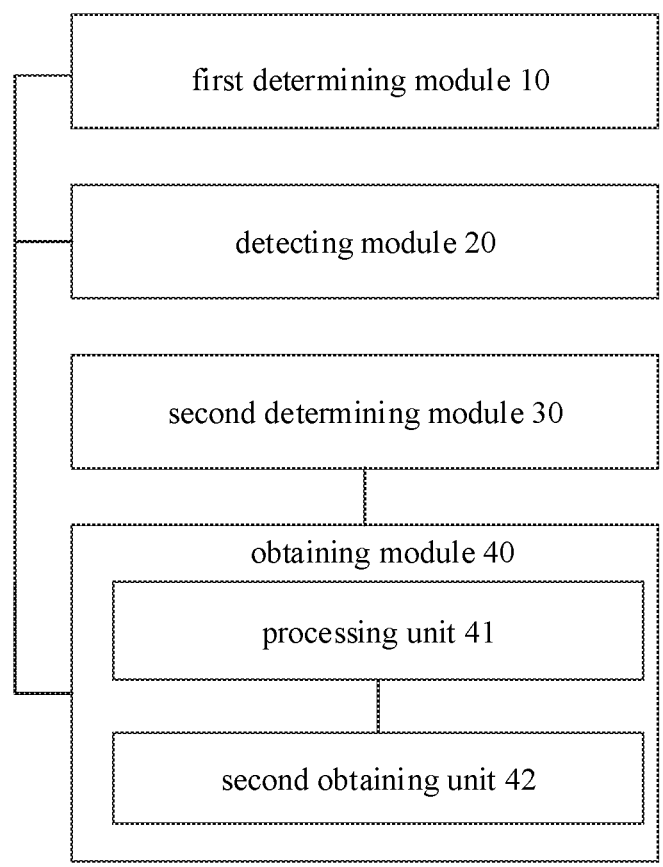
FIG. 5 is a block diagram illustrating an apparatus for processing a semantic analysis result based on AI according to yet another embodiment of the present disclosure.

FIG. 5 is a block diagram illustrating an apparatus for processing a semantic analysis result based on AI according to yet another embodiment of the present disclosure. As illustrated in FIG. 5, on the basis of FIG. 3, the first determining module 40 includes a processing unit 41 and a second obtaining unit 42.

In detail, the first processing unit 41 is configured to normalize the weights, the semantic confidence, the analysis type, and the field matching confidence to obtain normalized results of the weights, the semantic confidence, the analysis type, and the field matching confidence.

The second obtaining unit 42 is configured to sum up the normalized results of the weights, the semantic confidence, the analysis type, and the field matching confidence, so as to obtain the analysis quality data of the analysis result.

It should be noted that, above illustration and description of the method for processing a semantic analysis result based on AI also applies to the apparatus processing a semantic analysis result based on AI in embodiments of the present disclosure, thus details that not disclosed in the description of the apparatus for processing a semantic analysis result based on AI will not be elaborated.

With the apparatus for processing a semantic analysis result based on AI according to embodiments of the present disclosure, the weight of the analysis text in the corresponding analysis result is determined according to the preset weight configuration information; the semantic confidence of the analysis result is detected via the pattern matching algorithm; the analysis type of the analysis texts and the field matching confidence of the analysis texts over the analysis result are determined by the corresponding classification models; and then the analysis quality data of the analysis result is obtained according to the weights, the semantic confidence, the analysis type and the field matching confidence. Therefore, when the quality of the analysis result is evaluated, the weights, the semantic confidence, the analysis type and the field matching confidence are synthetically considered, thereby improving the accuracy of evaluating the quality of the semantic analysis result.

Figure 6:
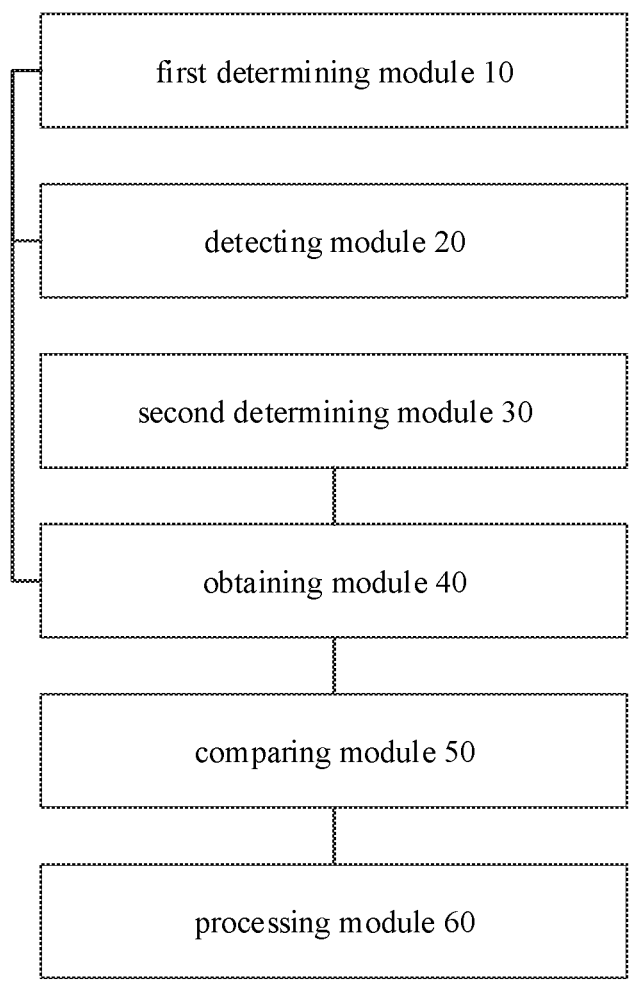
FIG. 6 is a block diagram illustrating an apparatus for processing a semantic analysis result based on AI according to yet another embodiment of the present disclosure.

FIG. 6 is a block diagram illustrating an apparatus for processing a semantic analysis result based on AI according to yet another embodiment of the present disclosure. As illustrated in FIG. 6, on the basis of FIG. 3, the apparatus for processing a semantic analysis result based on AI further includes a comparing module 50 and a processing module 60.

The comparing module 50 is configured to compare analysis quality data of a plurality of analysis results to a preset quality threshold.

The processing module 60 is configured to delete analysis results that cannot reach to the quality threshold.

In an embodiment of the present disclosure, the processing module 60 is further configured to sort analysis results that reach to the threshold, and feed back the analysis results to the user according to the sorting result.

It should be noted that, above illustration and description of the method for processing a semantic analysis result based on AI also applies to the apparatus processing a semantic analysis result based on AI in embodiments of the present disclosure, thus details that not disclosed in the description of the apparatus for processing a semantic analysis result based on AI will not be elaborated.

With the apparatus for processing a semantic analysis result based on AI according to embodiments of the present disclosure, the analysis quality data of the plurality of analysis results are compared to the preset quality threshold, the analysis results that cannot reach to the threshold are deleted and the analysis results that reach to the threshold are sorted, and the analysis results that reach to the threshold are fed back to the user according to the sorting result. Thus the user may observe the analysis result with a better analysis quality more directly, such that the performance of the semantic analysis is increased.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. In addition, those skilled in the art could combine or associate different embodiments, examples or characters of different embodiments or examples, as long as there are no contradictories.

Although embodiments of present disclosure have been illustrated and described above, it should be understood that above embodiments are just explanatory, and cannot be construed to limit the present disclosure, for those skilled in the art, changes, alternatives, and modifications can be made in the embodiments without departing from spirit, principles, and scope of the present disclosure.

What is claimed is:

1. A method for processing a semantic analysis result based on artificial intelligence, comprising:
   determining, by at least one computing device, a plurality of analysis results of input text received from a user;
   determining, by the at least one computing device, weights of analysis texts in a corresponding analysis result of the analysis results according to preset weight configuration information;
   detecting, by the at least one computing device, a semantic confidence of the analysis result via a pattern matching algorithm;
   determining, by the at least one computing device, an analysis type of the analysis texts by a first classification model;
   determining, by the at least one computing device, a field matching confidence of the analysis texts over the analysis result by a second classification model;
   obtaining, by the at least one computing device, analysis quality data of the analysis result according to the weights, the semantic confidence, the analysis type, and the field matching confidence;

comparing, by the at least one computing device, the analysis quality data of a plurality of analysis results to a preset quality threshold;

deleting, by the at least one computing device, at least one of the analysis results that does not reach to the quality threshold;

sorting, by the at least one computing device, analysis results that reach to the threshold; and feeding back the sorted analysis results to the user.

2. The method according to claim 1, wherein, determining, by at least one computing device, weights of analysis texts in a corresponding analysis result according to preset weight configuration information comprises:

obtaining, by the at least one computing device, a field type of each of the analysis texts;

determine, by the at least one computing device, a weight of the each of the analysis texts in the corresponding analysis result according to preset weight configuration information corresponding to the field type.

3. The method according to claim 1, wherein, obtaining, by the at least one computing device, analysis quality data of the analysis result according to the weights, the semantic confidence, the analysis type, and the field matching confidence comprises:

normalizing, by the at least one computing device, the weights, the semantic confidence, the analysis type, and the field matching confidence via a preset function model to obtain normalized results of the weights, the semantic confidence, the analysis type, and the field matching confidence;

summing up, by the at least one computing device, the normalized results of the weights, the semantic confidence, the analysis type, and the field matching confidence so as to obtain the analysis quality data of the analysis result.

4. The method according to claim 1, wherein, obtaining, by the at least one computing device, analysis quality data of the analysis result according to the weights, the semantic confidence, the analysis type, and the field matching confidence comprises:

performing, by the at least one computing device, a weighted calculation to obtain the analysis quality data of the analysis result according to the weights, the semantic confidence, the analysis type, and the field matching confidence via a preset weighted calculation model.

5. An apparatus for processing a semantic analysis result based on artificial intelligence, comprising:

a processor; and a memory, configured to store instructions executable by the processor, wherein the processor is configured to:

determine a plurality of analysis results of input text received from a user;

determine weights of analysis texts in a corresponding analysis result according to preset weight configuration information;

detect a semantic confidence of the analysis result via a pattern matching algorithm;

determine an analysis type of the analysis texts by a first classification model;

determine a field matching confidence of the analysis texts over the analysis result by a second classification model;

obtain analysis quality data of the analysis result according to the weights, the semantic confidence, the analysis type, and the field matching confidence, compare the analysis quality data of a plurality of analysis results to a preset quality threshold;

delete at least one of the analysis results that does not reach to the quality threshold;

sort analysis results that reach to the threshold; and, feed back at least part of the analysis result based at least in part on the analysis quality data.

6. The apparatus according to claim 5, wherein the processor is configured to obtain analysis quality data of the analysis result according to the weights, the semantic confidence, the analysis type, and the field matching confidence by acts of:

performing a weighted calculation to obtain the analysis quality data of the analysis result according to the weights, the semantic confidence, the analysis type, and the field matching confidence via a preset weighted calculation model.

7. The apparatus according to claim 5, wherein the processor is configured to determine weights of analysis texts in a corresponding analysis result according to preset weight configuration information by acts of:

obtaining a field type of each of the analysis texts;

determine a weight of the each of the analysis texts in the corresponding analysis result according to preset weight configuration information corresponding to the field type.

8. The apparatus according to claim 5, wherein the processor is configured to obtain analysis quality data of the analysis result according to the weights, the semantic confidence, the analysis type, and the field matching confidence by acts of:

normalizing, the weights, the semantic confidence, the analysis type, and the field matching confidence via a preset function model to obtain normalized results of the weights, the semantic confidence, the analysis type, and the field matching confidence;

summing up the normalized results of the weights, the semantic confidence, the analysis type, and the field matching confidence so as to obtain the analysis quality data of the analysis result.

9. A non-transitory computer readable storage medium, with instructions stored, wherein the instructions are executed by a processor to achieve a method for processing a semantic analysis result based on artificial intelligence, and the method comprises:

determining a plurality of analysis results of input text received from a user;

determining weights of analysis texts in a corresponding analysis result according to preset weight configuration information;

detecting a semantic confidence of the analysis result via a pattern matching algorithm;

determining an analysis type of the analysis texts by a first classification model;

determining a field matching confidence of the analysis texts over the analysis result by a second classification model;

obtaining analysis quality data of the analysis result according to the weights, the semantic confidence, the analysis type, and the field matching confidence;

comparing the analysis quality data of a plurality of analysis results to a preset quality threshold;

deleting at least one of the analysis results that does not reach to the quality threshold;

sorting analysis results that reach to the threshold; and feeding back the sorted analysis results to the user.

10. The non-transitory computer readable storage medium according to claim 9, wherein obtaining analysis quality data of the analysis result according to the weights, the semantic confidence, the analysis type, and the field matching confidence comprises:

performing a weighted calculation to obtain the analysis quality data of the analysis result according to the weights, the semantic confidence, the analysis type, and the field matching confidence via a preset weighted calculation model.

11. The non-transitory computer readable storage medium according to claim 9, wherein obtaining analysis quality data of the analysis result according to the weights, the semantic confidence, the analysis type, and the field matching confidence comprises:

normalizing the weights, the semantic confidence, the analysis type, and the field matching confidence via a preset function model to obtain normalized results of the weights, the semantic confidence, the analysis type, and the field matching confidence;

summing up the normalized results of the weights, the semantic confidence, the analysis type, and the field matching confidence so as to obtain the analysis quality data of the analysis result.

12. The non-transitory computer readable storage medium according to claim 9, wherein determining weights of analysis texts in a corresponding analysis result according to preset weight configuration information comprises:

obtaining a field type of each of the analysis texts;

determine a weight of the each of the analysis texts in the corresponding analysis result according to preset weight configuration information corresponding to the field type.

\* \* \* \* \*